(12) United States Patent
Lin et al.

(10) Patent No.: US 8,023,237 B2
(45) Date of Patent: Sep. 20, 2011

(54) ESD PROTECTION CIRCUIT AND METHOD THEREOF

(75) Inventors: I-Cheng Lin, Hsinchu (TW); Tao Cheng, Hsinchu (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 536 days.

(21) Appl. No.: 12/206,748

(22) Filed: Sep. 9, 2008

(65) Prior Publication Data

US 2010/0061026 A1    Mar. 11, 2010

(51) Int. Cl.
*H02H 9/00* (2006.01)
(52) U.S. Cl. ........................................................ 361/56
(58) Field of Classification Search .................. 361/56
See application file for complete search history.

(56) References Cited

U.S. PATENT DOCUMENTS

| | | | |
|---|---|---|---|
| 6,741,114 B2 * | 5/2004 | Kim | 327/310 |
| 6,908,821 B2 * | 6/2005 | Kim | 438/294 |
| 7,440,247 B2 * | 10/2008 | Wang et al. | 361/56 |
| 2007/0188953 A1 | 8/2007 | Lee et al. | |

* cited by examiner

*Primary Examiner* — Stephen W Jackson
(74) *Attorney, Agent, or Firm* — Winston Hsu; Scott Margo

(57) ABSTRACT

An Electrostatic Discharge protection circuit, the circuit includes a transient detecting circuit, a level adjusting circuit, a discharging circuit, and a sustaining circuit. The transient detecting circuit is coupled to a first pad for detecting an input signal at the first pad to generate a transient signal; the level adjusting circuit is coupled to the transient detecting circuit for adjusting an output voltage at an output terminal of the level adjusting circuit; the discharging circuit is coupled to the first pad and the output terminal of the level adjusting circuit for discharging the input signal of the first pad to a second pad when enabled by the output voltage; and the sustaining circuit is coupled between the level adjusting circuit and the transient detecting circuit, for selectively controlling the level adjusting circuit to sustain an enablement of the discharging circuit according to the transient signal.

9 Claims, 5 Drawing Sheets

US 8,023,237 B2

ESD PROTECTION CIRCUIT AND METHOD THEREOF

BACKGROUND

The present invention relates to an electrostatic discharge (ESD) protection circuit, and more particularly, to an electrostatic discharge protection circuit allowing enough time to discharge an electrostatic signal, and a method thereof.

Please refer to FIG. 1. FIG. 1 is a diagram illustrating a prior art electrostatic discharge (ESD) protection circuit 10, which is utilized for protecting an integrated device 20 from being damaged by an electrostatic signal. The ESD protection circuit 10 comprises a low pass filter 11, which comprises a resistor R and a capacitor C; an inverter 12, which includes a PMOS transistor Mpa and an NMOS transistor Mna; and a discharging circuit 13, which comprises an NMOS transistor Mnb. The connection between the low pass filter 11, the inverter 12, and the discharging circuit 13 are shown in FIG. 1. Furthermore, a first pad 14 is coupled to a first terminal $N_1$, and a second pad 15 is coupled to a second terminal $N_2$.

Please refer to FIG. 2. FIG. 2 is a timing diagram illustrating the voltages $V_a$, $V_c$, and $V_d$ at respective terminals $N_1$, $N_3$, and $N_4$ of the related art ESD protection circuit 10 shown in FIG. 1. Initially, the voltages $V_a$, $V_c$, and $V_d$ at terminals $N_1$, $N_3$, and $N_4$ are set to zero respectively. In other words, the PMOS transistor Mpa, the NMOS transistor Mna, and the NMOS transistor Mnb are initially turned off. When the electrostatic signal, which is the voltage $V_a$, is injected to the first pad 14 at time $t_1$, which has a peak voltage of $V_1'$, the PMOS transistor Mpa will suddenly be turned on at time $t_1$ to discharge the voltage $V_a$ at the first pad 14. Therefore, the voltage $V_a$ will instantaneously decrease to a voltage $V_3'$, as shown in FIG. 2. Furthermore, the voltage at the terminal $N_4$ will also be charged instantaneously into a voltage $V_2'$ at time $t_1$. Therefore, the voltage $V_2'$ will turn on the NMOS transistor Mnb for discharging the voltage $V_a$. Meanwhile, the low pass filter 11 proceeds to perform low pass filtering upon the voltage $V_a$ to generate the voltage $V_c$. As shown in FIG. 2, the voltage $V_c$ will increase gradually because of the low pass filtering characteristic of the resistor R and the capacitor C. After a time interval $\Delta t'$, the voltage $V_c$ will reach a voltage $V_4'$ and turn on the NMOS transistor Mna to discharge the voltage $V_d$ of terminal $N_4$. Then, the PMOS transistor Mpa and the NMOS transistor Mnb will be turned off. Please note that, in the time interval $\Delta t'$, the voltage $V_c$ increases gradually and the voltage $V_d$ of terminal $N_4$ decreases gradually, i.e. the currents that are conducted by the NMOS transistor Mnb and the PMOS transistor Mpa decrease gradually, and the current that is conducted by the NMOS transistor Mna increases gradually. Therefore, the voltage $V_a$ at the terminal $N_1$ may increase greatly after the NMOS transistor Mnb is turned off at time $t_2$, as shown in FIG. 2. This means that the charge at the terminal $N_1$ caused by the electrostatic signal cannot be totally discharged by the NMOS transistor Mnb within the time interval $\Delta t'$. According to related art, the increasing voltage at terminal $N_1$ will affect the normal operation of the integrated device 20.

SUMMARY OF THE INVENTION

Therefore, an electrostatic discharge protection circuit that is able to discharge an electrostatic signal and a related method thereof are disclosed.

According to an embodiment of the present invention, an Electrostatic Discharge (ESD) protection circuit is disclosed. The Electrostatic Discharge (ESD) protection circuit comprises: a transient detecting circuit, a level adjusting circuit, a discharging circuit, and a sustaining circuit. The transient detecting circuit is coupled to a first pad for detecting an input signal at the first pad to generate a transient signal; the level adjusting circuit is coupled to the transient detecting circuit for adjusting an output voltage at an output terminal of the level adjusting circuit according to the input signal; the discharging circuit is coupled to the first pad and the output terminal of the level adjusting circuit for discharging the input signal of the first pad to a second pad when enabled by the output voltage; and the sustaining circuit is coupled between the level adjusting circuit and the transient detecting circuit, for selectively controlling the level adjusting circuit to sustain an enablement of the discharging circuit according to the transient signal.

According to another embodiment of the present invention, an Electrostatic Discharge (ESD) protecting method is disclosed. The electrostatic discharge protecting method is utilized for protecting an integrated device, and comprises: detecting an input signal at a first pad of the integrated device to generate a transient signal; utilizing a level adjusting circuit to adjust an output voltage at an output terminal of the level adjusting circuit according to the input signal; utilizing a discharging circuit to discharge the input signal of the first pad to a second pad when the discharging circuit is enabled by the output voltage; and providing a sustaining circuit to selectively control the level adjusting circuit to sustain an enablement of the discharging circuit according to the transient signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
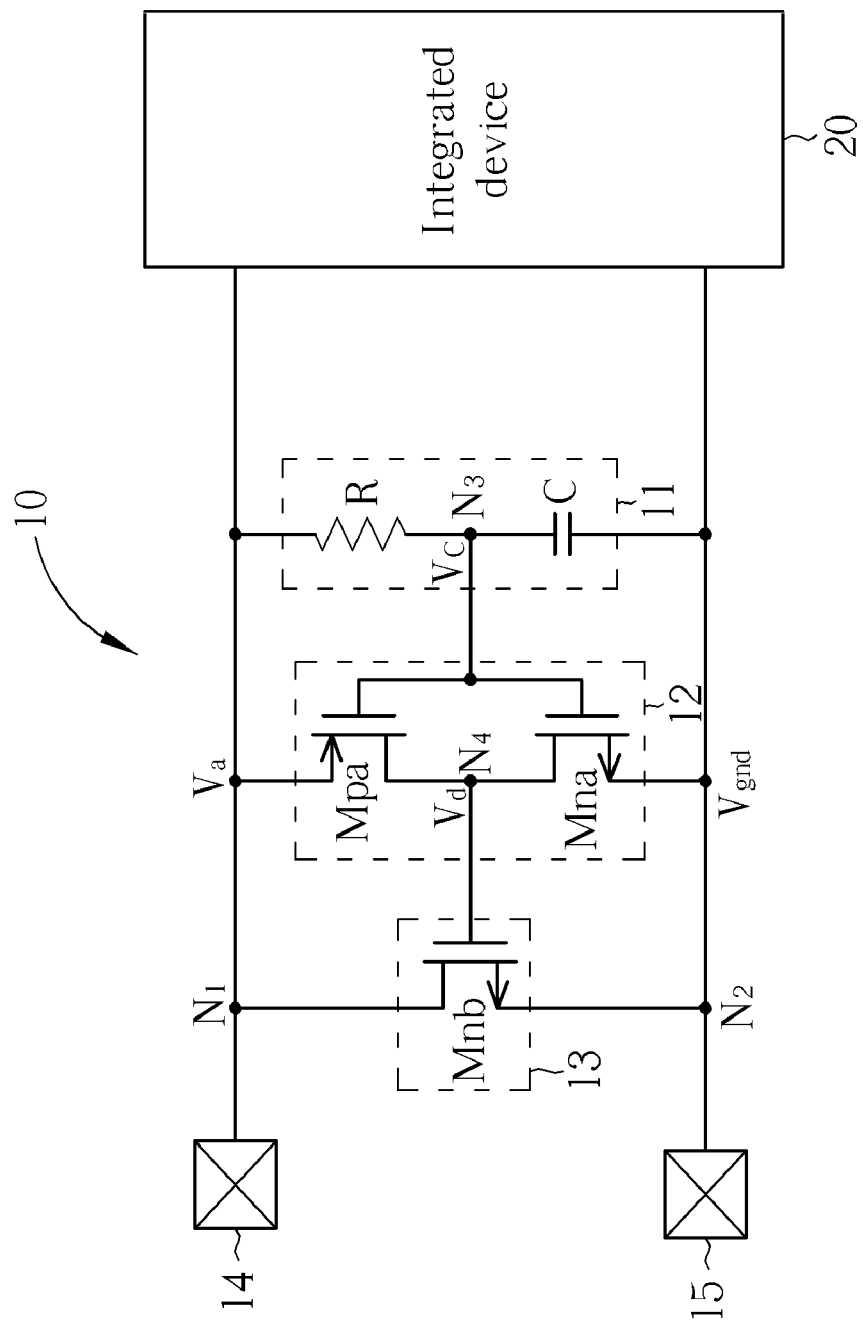
FIG. 1 is a diagram illustrating a related art electrostatic discharge (ESD) protection circuit.
Figure 2:
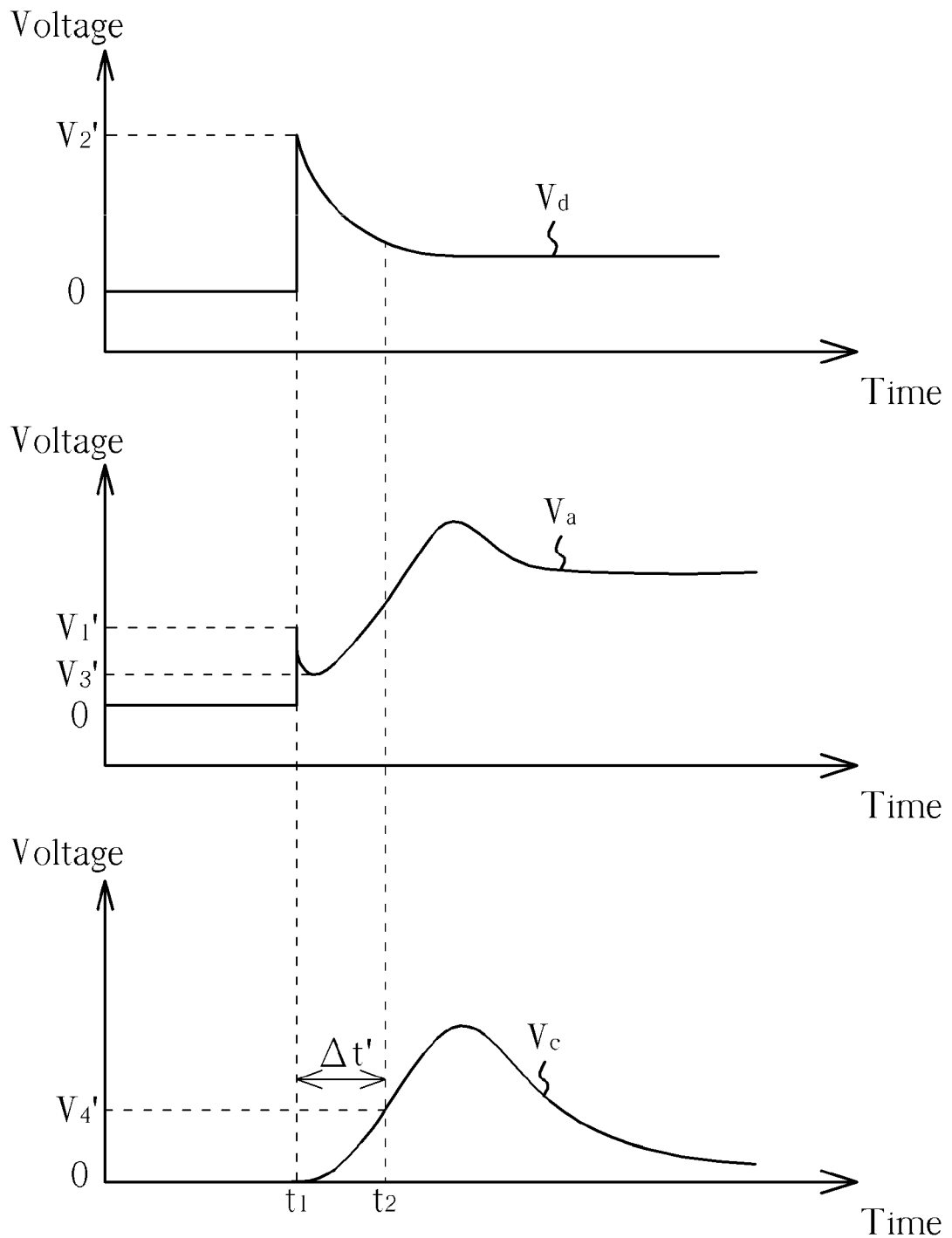
FIG. 2 is a timing diagram of the voltages $V_a$, $V_c$, and $V_d$ at respective terminals $N_1$, $N_3$, and $N_4$ of the ESD protection circuit of FIG. 1.
Figure 3:
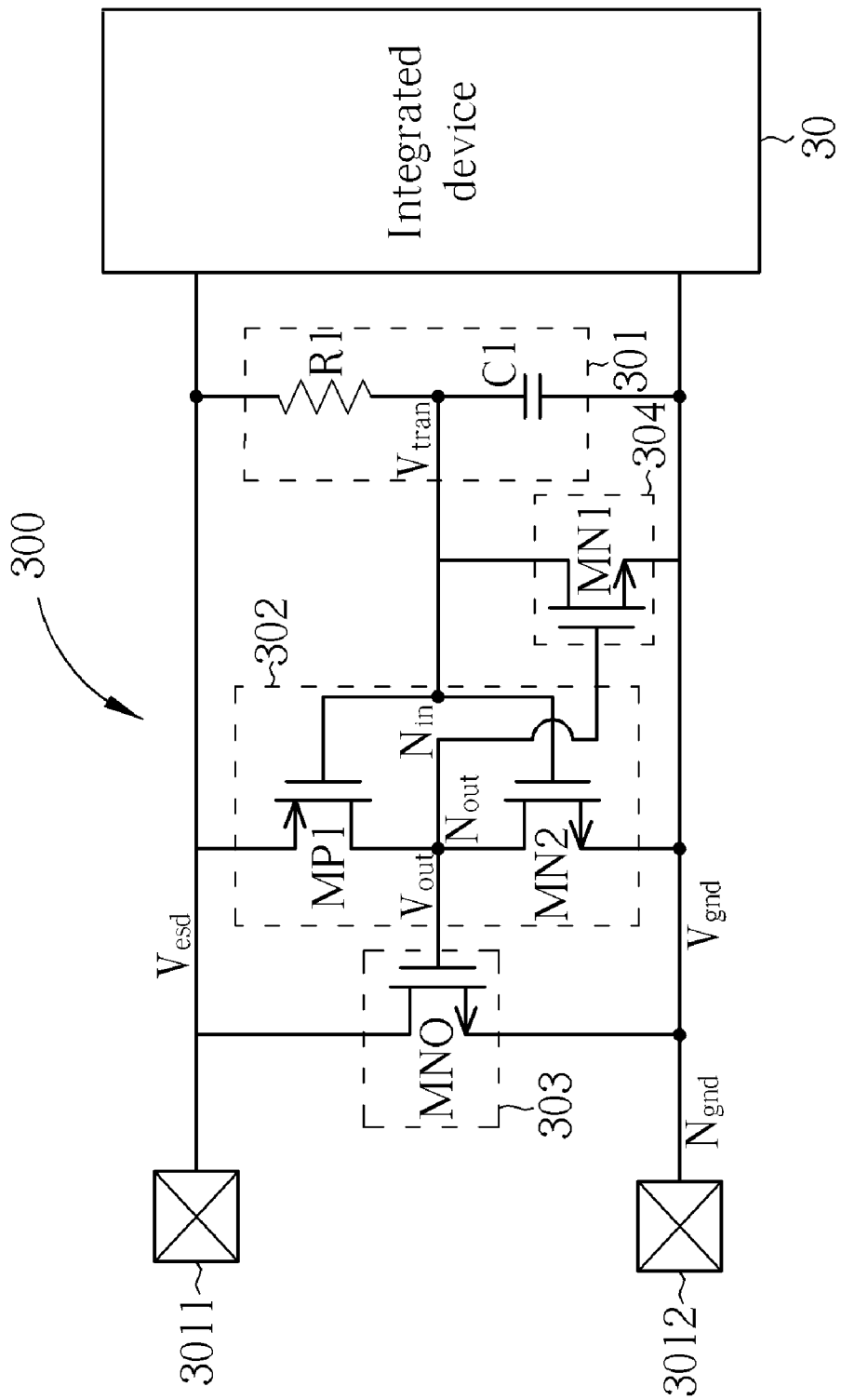
FIG. 3 is a diagram illustrating an electrostatic discharge protection circuit according to an embodiment of the present invention.

Please refer to FIG. 3. FIG. 3 is a diagram illustrating an electrostatic discharge (ESD) protection circuit 300 according to an embodiment of the present invention. The ESD protection circuit 300 is utilized for protecting an integrated device 30 from being damaged by an electrostatic signal. The ESD protection circuit 300 comprises a transient detecting circuit 301, a level adjusting circuit 302, a discharging circuit 303, and a sustaining circuit 304. The transient detecting circuit 301, coupled to a first pad 3011, is utilized for detecting an input signal $V_{esd}$ at the first pad 3011 to generate a transient signal $V_{tran}$; the level adjusting circuit 302, coupled to the transient detecting circuit 301, is utilized for adjusting an output voltage $V_{out}$ at an output terminal $N_{out}$ of the level adjusting circuit 302 according to the input signal $V_{esd}$; the discharging circuit 303, coupled to the first pad 3011 and the output terminal $N_{out}$ of the level adjusting circuit 302, is utilized for discharging the input signal $V_{esd}$ of the first pad 3011 to a second pad 3012 when enabled by the output voltage $V_{out}$; and the sustaining circuit 304, coupled between the level adjusting circuit 302 and the transient detecting circuit 301, is utilized for selectively controlling the level adjusting circuit 302 to sustain an enablement of the discharging circuit 303 according to the transient signal $V_{tran}$. Please note that, for brevity, the input signal $V_{esd}$ can be viewed as an electrostatic signal that occurs at the first pad 3011.

According to the embodiment shown in FIG. 3, the sustaining circuit 304 comprises a first transistor MN1 having a gate terminal coupled to the output terminal $N_{out}$, a drain terminal $N_{in}$ coupled to the transient signal $V_{tran}$, and a second terminal $N_{gnd}$ coupled to the second pad 3012. The level adjusting circuit 302 is implemented using an inverter having an input node coupled to the drain terminal $N_{in}$ of the sustaining circuit 304 and an output node serving as the output terminal $N_{out}$ of the level adjusting circuit 302. The inverter comprises an N-type transistor MN2 and a P-type transistor MP1, and the detailed connection is shown in FIG. 3. Please note that the level adjusting circuit 302 is not limited to be configured as an inverter, and any other circuit that has the similar functionality of inverting a signal also belongs to the spirit of the present invention. For example, the level adjusting circuit 302 can be comprised of a capacitor having a terminal coupled to the first pad 3011; and a second transistor having a drain terminal coupled to another terminal of the first capacitor, a source terminal coupled to the second pad 3012, and a gate terminal coupled to the transient signal $V_{tran}$. The transient detecting circuit 301 is a low pass filter, and the low pass filter comprises: a resistor R1, having a terminal coupled to the first pad 3011, and another terminal coupled to the drain terminal $N_{in}$ of the sustaining circuit 304; and a capacitor C1, having a terminal coupled to the drain terminal $N_{in}$ of the sustaining circuit 304, and another terminal coupled to the second pad 3012. Furthermore, the discharging circuit 303 comprises an N-type transistor MN0, having a drain terminal coupled to the first pad 3011, a source terminal coupled to the second pad 3012, and a gate terminal coupled to the output terminal $N_{out}$ of the level adjusting circuit 302.

Figure 4:
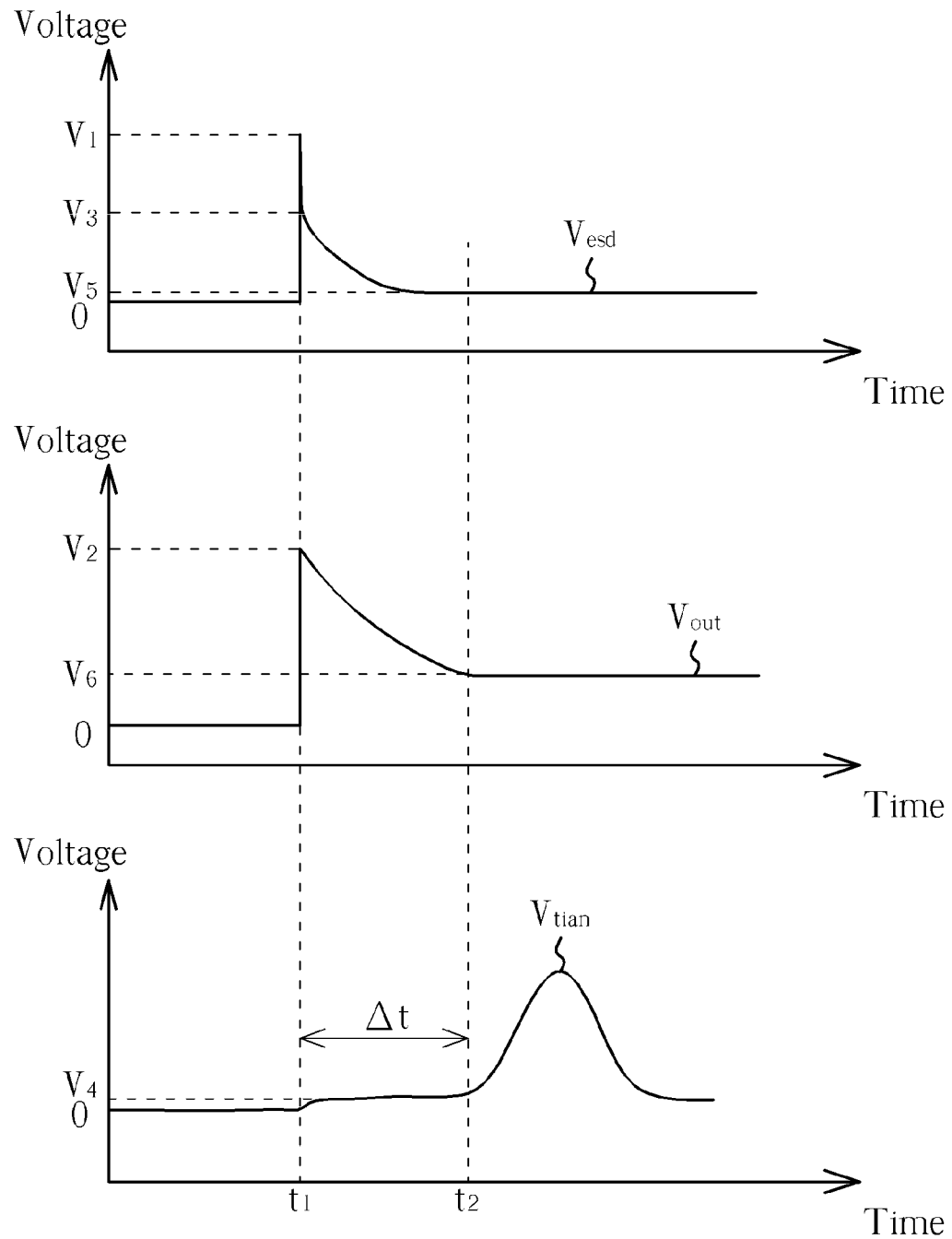
FIG. 4 is a timing diagram of the input signal, the output voltage, and the transient signal of the ESD protection circuit of FIG. 3.

Please refer to FIG. 4. FIG. 4 is a timing diagram of the input signal $V_{esd}$ at the first pad 3011, the output voltage $V_{out}$ at the output terminal $N_{out}$, and the transient signal $V_{tran}$. Initially, the voltage at the first pad 3011 is set to zero, which is the same as the voltage of the second terminal $N_{gnd}$. Therefore, the voltage at the drain terminal $N_{in}$ of the sustaining circuit 304 is also zero initially. In other words, the N-type transistor MN0, the first transistor MN1, N-type transistor MN2, and a P-type transistor MP1 are turned off initially. When the input signal $V_{esd}$ is injected to the first pad 3011 at time $t_1$, which has a peak voltage of $V_1$, the P-type transistor MP1 will suddenly be turned on at time $t_1$ to discharge the input signal $V_{esd}$ of the first pad 3011. Therefore, the input signal $V_{esd}$ will decrease to a voltage $V_3$ instantaneously, as shown in FIG. 4. Furthermore, the voltage at the output terminal $N_{out}$ will also be charged instantaneously to a voltage $V_2$ at time $t_1$. The voltage $V_2$ is lower than the voltage $V_1$; however, the voltage $V_2$ is still high enough to turn on the N-type transistor MN0 for discharging the input signal $V_{esd}$. Meanwhile, the transient detecting circuit 301 proceeds to low pass the input signal $V_{esd}$ to generate the transient signal $V_{tran}$. Referring to FIG. 4, the transient signal $V_{tran}$ will remain at 0V at time $t_1$ due to the low passing characteristic of the resistor R1 and the capacitor C1. Furthermore, the first transistor MN1 will also be turned on by the output voltage $V_{out}$ at time $t_1$. Accordingly, the first transistor MN1 will generate another current path at the terminal $N_{in}$ after time $t_1$. The current path is utilized for prolonging the voltage level at the terminal $N_{in}$ to stay at a low voltage $V_4$, which is approximated to 0V as shown in FIG. 4. On the other hand, the low pass filter formed by the resistor R1 and the capacitor C1 is designed to have a large enough time constant in order to make the transient signal $V_{tran}$ maintained at a low voltage at the instant of the injection of the input signal $V_{esd}$ at the first pad 3011. Accordingly, the voltage at the terminal $N_{in}$ will stay at the low voltage $V_4$ for a time interval $\Delta t$ before the first transistor MN1 is turned off.

The output terminal $N_{out}$ is therefore floating after time $t_1$, and the N-type transistor MN0 will keep discharging the input signal $V_{esd}$. According to the present invention, the ESD protection circuit 300 can be designed to discharge the input signal $V_{esd}$ to approach 0V before the N-type transistor MN0 and the first transistor MN1 are turned off. In other words, the first transistor MN1 will turn off the N-type transistor MN2 in the time interval $\Delta t$. If the time interval $\Delta t$ is long enough, the input signal $V_{esd}$ can be discharged to an acceptable low voltage $V_5$, as shown in FIG. 4. At the same time, the output voltage $V_{out}$ will also decrease gradually due to the leakage current at the output terminal $N_{out}$. After the time interval $\Delta t$, the output voltage $V_{out}$ will reach a voltage $V_6$, which will turn off the N-type transistor MN0 and the first transistor MN1. Then, the current path formed by the first transistor MN1 is opened, and a current may charge the capacitor C1 to increase the voltage at the terminal $N_{in}$; however, this will not affect the normal operation of the integrated device 30.

Figure 5:
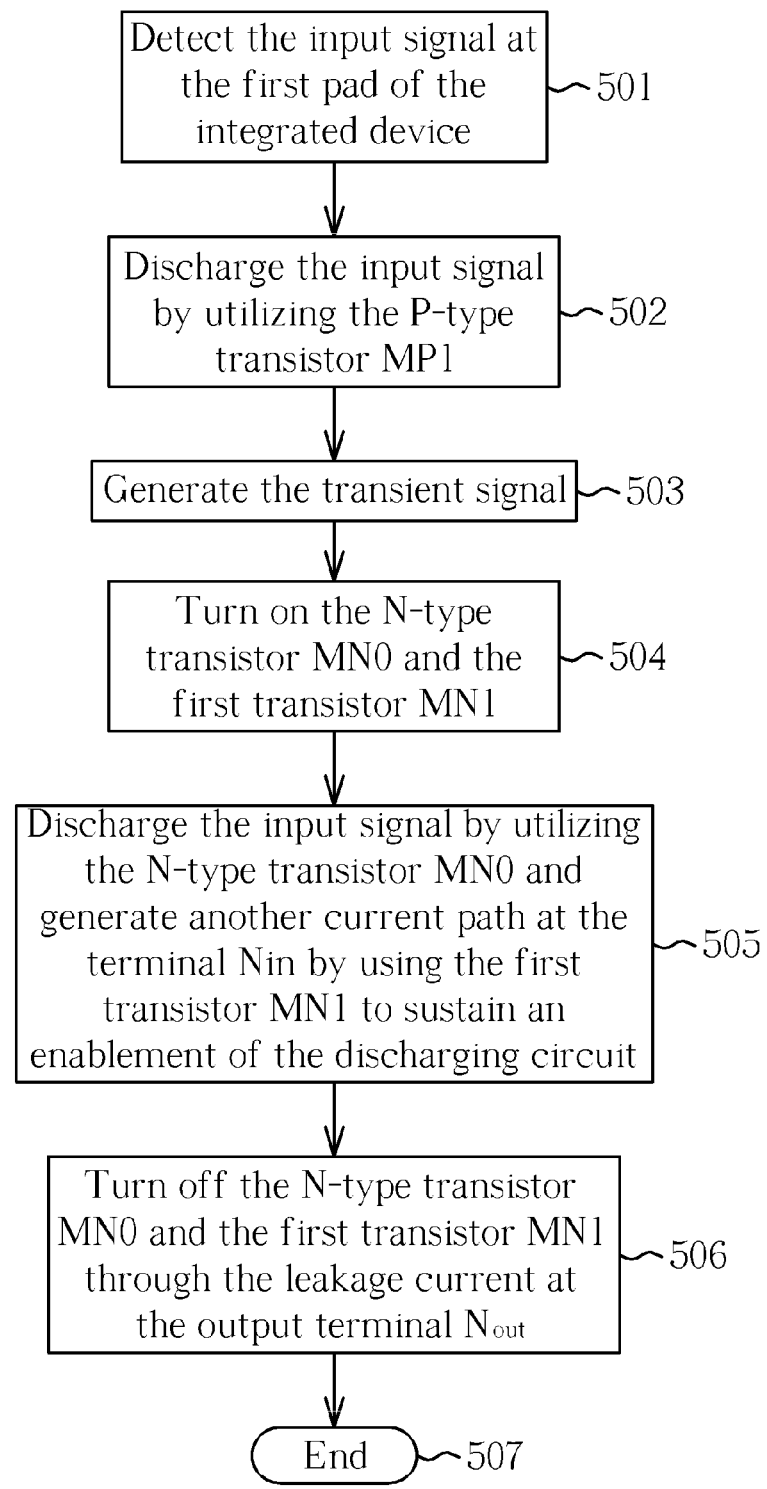
FIG. 5 is a flowchart illustrating an electrostatic protection method according to an embodiment of the present invention.

Please refer to FIG. 5. FIG. 5 is a flowchart illustrating an electrostatic protection method according to an embodiment of the present invention. The electrostatic protection method is utilized for protecting the integrated device 30 of FIG. 3, and the method comprises the following steps:

Step 501: Detect the input signal $V_{esd}$ at the first pad 3011 of the integrated device 30;

Step 502: Discharge the input signal $V_{esd}$ by utilizing the P-type transistor MP1;

Step 503: Generate the transient signal $V_{tran}$;

Step 504: Turn on the N-type transistor MN0 and the first transistor MN1;

Step 505: Discharge the input signal $V_{esd}$ by utilizing the N-type transistor MN0 and generate another current path at the terminal $N_{in}$ by using the first transistor MN1 to sustain an enablement of the discharging circuit 303;

Step 506: Turn off the N-type transistor MN0 and the first transistor MN1 through the leakage current at the output terminal $N_{out}$;

Step 507: End.

Please note that in step 505 the first transistor MN1 will turn off the N-type transistor MN2 in the time interval $\Delta t$. If the time interval $\Delta t$ is long enough, the input signal $V_{esd}$ can be discharged to an acceptable low voltage $V_5$, as shown in FIG. 4. After the time interval $\Delta t$, the output voltage $V_{out}$ will reach a voltage $V_6$, which will turn off the N-type transistor MN0 and the first transistor MN1 (Step 506). Then, the current path formed by the first transistor MN1 is opened, and a current may charge the capacitor C1 to increase the voltage at the terminal $N_{in}$; however this will not affect the normal operation of the integrated device 30.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An Electrostatic Discharge (ESD) protection circuit, comprising:
   a transient detecting circuit, coupled to a first pad, for detecting an input signal at the first pad to generate a transient signal;
   a level adjusting circuit, coupled to the transient detecting circuit, for adjusting an output voltage at an output terminal of the level adjusting circuit according to the input signal;
   a discharging circuit, coupled to the first pad and the output terminal of the level adjusting circuit, for discharging the input signal of the first pad to a second pad when enabled by the output voltage; and
   a sustaining circuit, coupled between the level adjusting circuit and the transient detecting circuit, for selectively controlling the level adjusting circuit to sustain an enablement of the discharging circuit according to the transient signal.

2. The ESD protection circuit of claim 1, wherein the sustaining circuit comprises a first transistor having a control terminal coupled to the output terminal, a first terminal coupled to the transient signal, and a second terminal coupled to the second pad.

3. The ESD protection circuit of claim 2, wherein the level adjusting circuit is an inverter having an input node coupled to the first terminal of the sustaining circuit and an output node serving as the output terminal of the level adjusting circuit.

4. The ESD protection circuit of claim 2, wherein the level adjusting circuit comprises:
   a first capacitor, having a terminal coupled to the first pad; and
   a second transistor, having a first terminal coupled to another terminal of the first capacitor, a second terminal coupled to the second pad, and a control terminal coupled to the transient signal.

5. The ESD protection circuit of claim 2, wherein the transient detecting circuit is a low pass filter, and the low pass filter comprises:
   a resistor, having a terminal coupled to the first pad, and another terminal coupled to the first terminal of the sustaining circuit; and
   a capacitor, having a terminal coupled to the first terminal of the sustaining circuit, and another terminal coupled to the second pad.

6. An electrostatic protection method, for protecting an integrated device, comprising:
   detecting an input signal at a first pad of the integrated device to generate a transient signal;
   utilizing a level adjusting circuit to adjust an output voltage at an output terminal of the level adjusting circuit according to the input signal;
   utilizing a discharging circuit to discharge the input signal of the first pad to a second pad when the discharging circuit is enabled by the output voltage; and
   providing a sustaining circuit to selectively control the level adjusting circuit to sustain an enablement of the discharging circuit according to the transient signal.

7. The electrostatic protection method of claim 6, wherein the sustaining circuit sustains a low voltage level to sustain the enablement of the discharging circuit.

8. The electrostatic protection method of claim 7, wherein utilizing the level adjusting circuit to adjust the output voltage at the output terminal of the level adjusting circuit comprises inverting the input signal to adjust the output voltage.

9. The electrostatic protection method of claim 7, wherein detecting an input signal at a first pad of the integrated device to generate a transient signal comprises low passing the input signal to generate the transient signal.

\* \* \* \* \*